United States Patent
Chang

(10) Patent No.: US 8,385,072 B2
(45) Date of Patent: Feb. 26, 2013

(54) COMPUTER HAVING AIRFLOW GUIDING DEVICE

(75) Inventor: Yao-Ting Chang, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 56 days.

(21) Appl. No.: 13/094,756

(22) Filed: Apr. 26, 2011

(65) Prior Publication Data

US 2012/0140408 A1 Jun. 7, 2012

(30) Foreign Application Priority Data

Dec. 3, 2010 (TW) .............................. 99142067 A

(51) Int. Cl.
*H05K 7/20* (2006.01)
(52) U.S. Cl. .......... 361/719; 361/751; 361/762; 174/78; 174/260; 439/485
(58) Field of Classification Search .................. 361/704, 361/707, 709–713, 719–720, 748–751, 753, 361/760–762

See application file for complete search history.

(56) References Cited

U.S. PATENT DOCUMENTS

| 6,504,718 | B2 * | 1/2003 | Wu ................................. 361/695 |
| 7,342,786 | B2 * | 3/2008 | Malone et al. ................. 361/695 |
| 7,817,417 | B2 * | 10/2010 | Franz et al. ............... 361/679.51 |
| 8,081,453 | B2 * | 12/2011 | Sun ................................. 361/690 |
| 2009/0059519 | A1 * | 3/2009 | Ong et al. ...................... 361/690 |
| 2011/0317359 | A1 * | 12/2011 | Wei et al. ....................... 361/690 |

* cited by examiner

*Primary Examiner* — Courtney Smith
(74) *Attorney, Agent, or Firm* — Altis Law Group, Inc.

(57) ABSTRACT

A computer includes a main board, a plurality of electrical element mounted on the main board and a airflow guising device. The airflow guiding device includes a metallic cover and two flexible films. The cover includes a top plate and two side plates extending downward from opposite edges of the top plate. The top plate and the side plates cooperatively define a guiding channel. Each side plate is spaced a distance from the main board to form a clearance space. The flexible films are correspondingly attached to the side plates. Each flexible film includes a connecting portion and a shielding portion. The connecting portion is attached on the corresponding side plate. The shielding portion extends from an edge of the corresponding side plate to the main board and shields the clearance space.

6 Claims, 3 Drawing Sheets

COMPUTER HAVING AIRFLOW GUIDING DEVICE

BACKGROUND

1. Technical Field

The present disclosure relates to a computer having an airflow guiding device.

2. Description of Related Art

An airflow guiding device is usually used in a computer for guiding heat dissipating airflow. The airflow guiding device and other electrical elements of the computer are positioned on a main board. The airflow guiding device is spaced from the main board for preventing contact with the electrical elements.

However, the air flowing in the airflow guiding device can deviate from the desired airflow path via the clearance space between the main board and the airflow guiding device, therefore, the heat dissipation efficiency of the computer may be reduced.

What is needed therefore is an airflow guiding device and computer having the same addressing the limitations described.

BRIEF DESCRIPTION OF THE DRAWINGS

The components of the drawings are not necessarily drawn to scale, the emphasis instead being placed upon clearly illustrating the principles of the embodiments of the airflow guiding device and computer having the same. Moreover, in the drawings, like reference numerals designate corresponding parts throughout several views.

DETAILED DESCRIPTION

Figure 1:
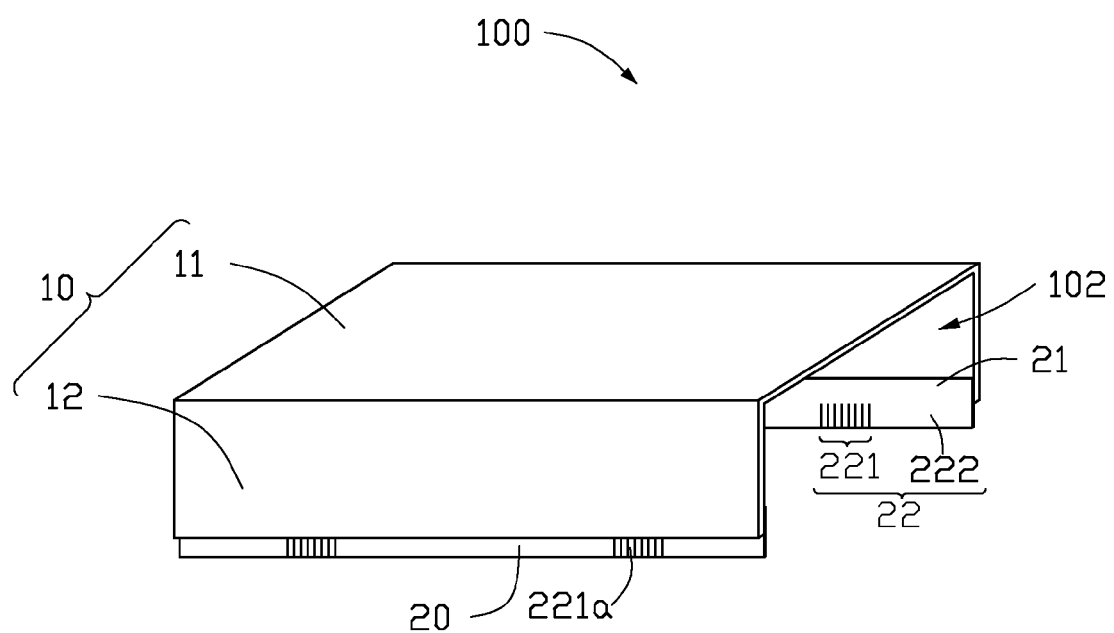
FIG. 1 is an isometric view of an airflow guiding device, according to an exemplary embodiment of the present disclosure

Referring to FIG. 1, an airflow guiding device 100, according to an exemplary embodiment, is shown. The airflow guiding device 100 includes a metallic cover 10 and two flexible films 20.

The cover 10 defines a guiding channel 102 therein for guiding airflow. Typically, one end of the guiding channel 102 is aligned with a fan (not shown), and the other end of the guiding channel 102 is aligned with a heat generating electrical element (not shown), such as a CPU. The cover 10 includes a top plate 11 and two side plates 12 extending downward from opposite edges of the top plates 11. The two side plates 12 are substantially parallel to each other. The guiding channel 102 is defined between the top plate 11 and the side plates 12.

The two flexible films 20 are respectively positioned at edges of the two side plates 12. Each flexible film 20 includes a connecting portion 21 and a shielding portion 22 connected to the connecting portion 21. The connecting portion 21 is configured for being attached to a corresponding side plate 12. The shielding portion 22 includes a number of strip portions 221 and a number of sheet portions 222 spaced from each other by the strip portions 221. Each strip portion 221 includes a number strips 221a substantially parallel to each other, and a lengthwise direction of the strips 221a is substantially perpendicular to a lengthwise direction of the corresponding flexible film 20. In this embodiment, the flexible films 20 are thin polyester films such as MYLAR films.

In assembly, the connecting portion 21 of each flexible film 20 is attached to a surface of a corresponding side plate 12, each shielding portion 22 extends from an edge of the corresponding side plate 12 away from the top plate 11. The connecting portions 21 can be adhered on the surface of the side plate 12 by adhesive. In this embodiment, the connecting portions 21 are attached to the inner surface of the corresponding side plate 12. Alternatively, the connecting portions 21 can be respectively attached to the outer surfaces of the side plates 12.

Figure 2:
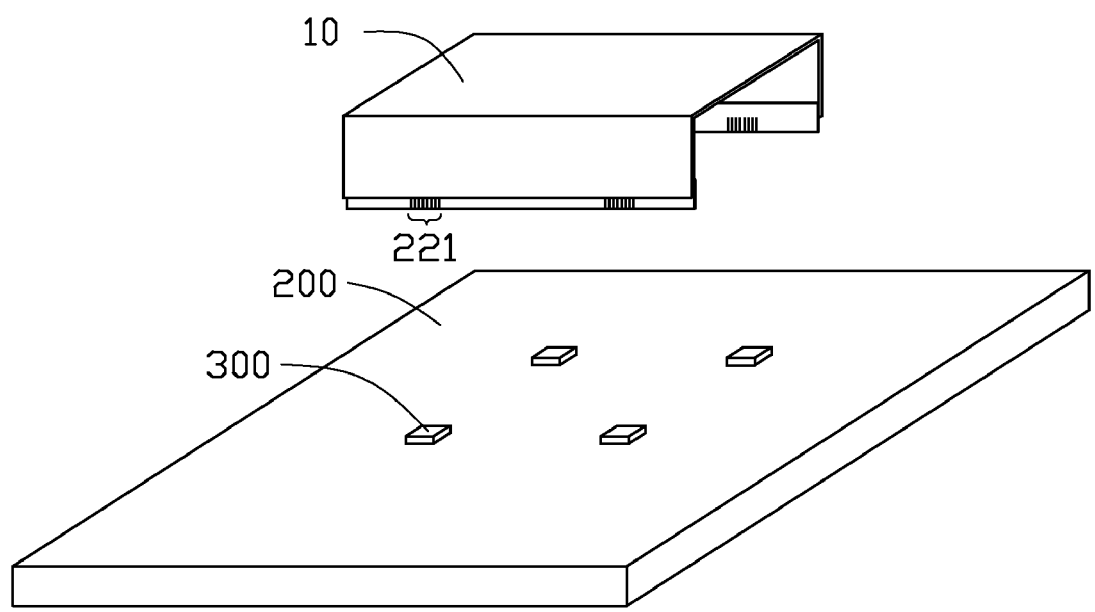
FIG. 2 is an isometric view of the airflow guiding device of FIG. 1, together with a main board with electrical elements thereon.
Figure 3:
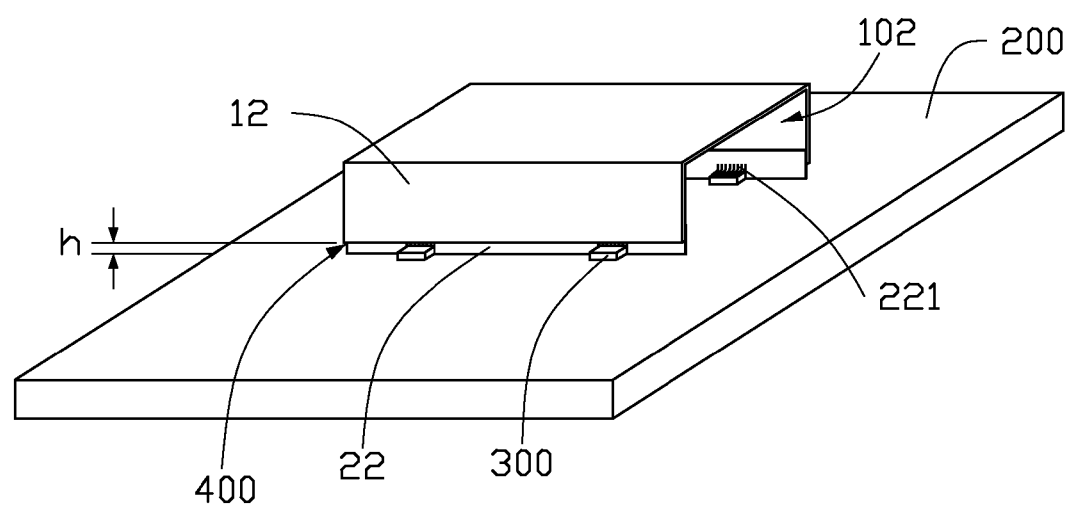
FIG. 3 is similar to FIG. 2, but showing the airflow guiding device mounted on the main board.

Referring to FIGS. 2-3, the airflow guiding device 100 is used to cover a main board 200. The main board 200 includes a number of electrical elements 300 mounted on a surface of the main board 200. The electrical elements 200 extend a distance from the surface of the main board 200. A clearance space 400 is defined between a lower edge of each side plate 12 and the surface of the main board 200 with the electrical elements. A vertical height h of the clearance space 400 is greater than the height of the electrical elements 200. The shielding portion 22 of each flexible film 20 shields a corresponding clearance space 400. The strip portions 221 spatially correspond to the electrical elements 300, and the strips 221a of each strip portion 221 are bent and contact the corresponding electrical elements 300 to shield the opening between the side plate 12 and the electrical elements 300. The sheet portions 222 shield an opening between the side plate 12 and the surface of the main board 200.

When air flows through the guiding channel 102, the shielding portion 22 of each flexible film 20 can shield the clearance space 400 between the corresponding side plate 12 and the main board 200, preventing air deviating from the desired airflow path.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A computer, comprising:
   a main board;
   a plurality of electrical elements mounted on the main board; and
   an airflow guiding device comprising:
      a metallic cover comprising a top plate and two side plates extending downward from opposite edges of the top plate, the top plate and the side plates cooperatively defining a guiding channel, each side plate spaced a distance from the main board to form a clearance space between the side plate and the main board; and
      two flexible films respectively attached to the side plates, each flexible film comprising a connecting portion and a shielding portion, the connecting portion being attached on a respective one of the side plates, the shielding portion extending from an edge of the respective side plate to the main board and shielding the clearance space, the shielding portion comprising a plurality of strip portions and a plurality of sheet portions, each strip portion spatially corresponding to an electrical element and shielding an opening between the respective side plate and a top surface of the corresponding electrical element, and the sheet portions shielding an opening between the respective side plate and a surface of the main board, each strip portion comprising a plurality of strips substantially parallel to each other, each of the strips being bent and contacting the corresponding electrical element to shield the opening between the respective side plate and the corresponding electrical element.

2. The computer of claim 1, wherein the electrical elements are spaced from the side plates and contact the corresponding flexible film.

3. The computer of claim 1, wherein the side plates are substantially parallel to each other and substantially perpendicular to the top plate.

4. The computer of claim 1, wherein a lengthwise direction of the strips is substantially perpendicular to a lengthwise direction of the corresponding flexible film.

5. The computer of claim 1, wherein the flexible films are comprised of polyester.

6. The computer of claim 1, wherein a total width of the strips of each strip portion are substantially equal to a width of the corresponding electrical element.

* * * * *